United States Patent [19]

Cannone

[11] Patent Number: 4,605,605
[45] Date of Patent: Aug. 12, 1986

[54] LEAD-ACID BATTERY HAVING POSITIVE POSTS OF LEAD-TIN ALLOY

[75] Inventor: Anthony G. Cannone, Cranford, N.J.

[73] Assignee: AT&T Bell Laboratories, Murray Hill, N.J.

[21] Appl. No.: 778,755

[22] Filed: Sep. 19, 1985

Related U.S. Application Data

[63] Continuation of Ser. No. 540,160, Oct. 7, 1983, abandoned.

[51] Int. Cl.$^4$ ............................................. H01M 2/08
[52] U.S. Cl. .................................. 429/174; 429/181; 429/185
[58] Field of Search ............... 429/174, 178, 181, 185

[56] References Cited

U.S. PATENT DOCUMENTS

| | | | |
|---|---|---|---|
| 3,434,883 | 3/1969 | Babusci | 136/14 |
| 3,490,954 | 1/1970 | Babusci | 136/168 |
| 3,532,545 | 10/1970 | Babusci | 136/36 |
| 3,556,853 | 1/1971 | Cannone | 136/36 |
| 3,652,340 | 3/1972 | Sharpe | 136/168 |
| 3,964,934 | 6/1976 | Ching, Jr. et al. | 429/178 |
| 4,170,470 | 10/1979 | Marshall et al. | 429/226 |

Primary Examiner—Charles F. Lefevour
Attorney, Agent, or Firm—Walter G. Nilsen

[57] ABSTRACT

Many post seals for lead-acid batteries make use of compression seals. These seals, when used on the positive post, are often subject to abnormal anodic corrosion. The invention is a lead-acid battery in which the positive post is made of a tin-lead alloy (generally from 0.1 to 1.2 weight percent tin). The use of such an alloy at the positive post greatly reduces the rate of anodic corrosion.

6 Claims, 6 Drawing Figures

LEAD-ACID BATTERY HAVING POSITIVE POSTS OF LEAD-TIN ALLOY

This application is a continuation of application Ser. No. 540,160, filed Oct. 7, 1983 now abandoned.

TECHNICAL FIELD

The invention is a lead-acid battery with a special positive electrode post.

BACKGROUND OF THE INVENTION

The lead-acid secondary battery is used extensively as a source of power for starting automobile and other engines, as a constant voltage source and as a source of power for emergency use. For many of these uses this battery has proved quite satisfactory. It is relatively cheap, durable and responds to a variety of power demands. Its lifetime is usually limited to a few years but for many applications this is satisfactory.

One use of lead-acid batteries which is becoming increasingly important is as a standby source for emergency power use. Typical standby uses are in telephone equipment and computers to provide temporary power at power outages and to start power generator systems. In this application large power capacities are required but demand for this power is usually relatively infrequent. In order to obtain large power capacities from batteries, a relatively large initial investment is required.

The failure mechanisms usually present in continuously or frequently used lead-acid batteries are often not present in lead-acid batteries employed for standby, emergency use. Many failure mechanisms for lead-acid batteries depend on the extent of use. For standby batteries that are infrequently used, such failure mechanisms that depend on use are often not important. For this reason, standby lead-acid batteries often have longer lifetimes and different failure mechanisms from frequently used batteries. It is highly desirable to minimize or eliminate failure mechanisms characteristic of infrequently used lead-acid batteries so as to maximize the useful lifetime of such standby lead-acid batteries.

Lead-acid batteries have a large variety of seals between conducting parts and insulating parts. A particular example is the seal between the positive battery post and the casing in a lead-acid battery. High reliability and long life are highly desirable in such seals. A large number of seals have been described in the literature. Particularly interesting are a series of seal designs disclosed in U.S. Pat. No. 3,434,883 issued to L. D. Babusci et al on Mar. 25, 1969 and U.S. Pat. No. 3,490,954 issued to L. D. Babusci et al on Jan. 20, 1970. These references describe a much improved seal design for lead-acid batteries. Such designs depend on good adhesion between the battery post (or at least a conducting part of the battery) and the battery jar or nonconducting part of the battery. A particularly useful post seal which is convenient to manufacture in large numbers is described in U.S. Pat. No. 3,652,340 issued to L. H. Sharpe et al on Mar. 28, 1972.

Long-lasting, reliable seals are particularly desirable for the positive post of lead-acid batteries. Here, adhesion to the positive post is often more difficult for two reasons. Electrochemical action at the positive post tends to cause corrosion. The same electrochemical action may also prevent adhesion of sealing substance to the post material. Long life for such positive post seals are highly desirable for lead-acid batteries made for standby use such as those described in U.S. Pat. No. 3,434,883 issued to L. D. Babusci et al on Mar. 25, 1969, U.S. Pat. No. 3,532,545 issued to L. D. Babusci et al on Oct. 6, 1970 and U.S. Pat. No. 3,556,853 issued to A. G. Cannone on Jan. 19, 1971.

SUMMARY OF THE INVENTION

The invention is a lead-acid battery in which the positive post is made of a lead alloy with from 0.1 to 1.5 weight percent tin. The particular advantage of such a positive post is good adherence and long lifetime of post seals attached to such a post. The invention is particularly applicable to post seals using epoxy and especially applicable to long-lasting batteries such as those used for standby use and especially the cylindrical cells described in the reference given above. The use of posts as described above leads to extremely reliable post seals, with excellent durability and lifetimes.

DETAILED DESCRIPTION

Figure 1:
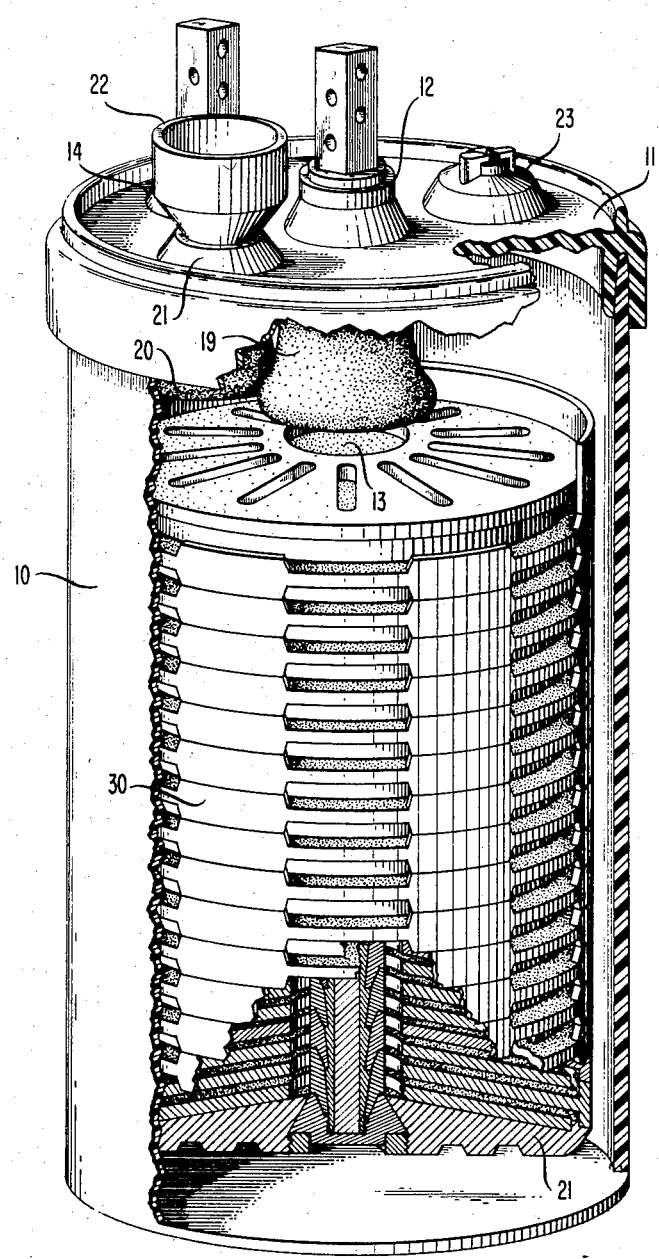
FIG. 1 shows a particular lead-acid cell design useful as a standby, long life electrical energy source.

The invention is a lead-acid battery with a positive post seal which has a positive post made from a certain type of lead alloy. The alloy contains from 0.1 to 1.5 weight percent tin, remainder lead. Small amounts of other metals may also be included in the lead alloy without adverse effects. Typical metals in this category are silver, zinc, beryllium, copper, antimony, calcium, etc. Although up to 10 weight percent of such metals can be tolerated, no benefits, as far as the post seal characteristics are concerned, are realized and relatively pure lead-tin alloy is preferred. Generally, purity of 98 or even 99 weight percent is preferred with purities of 99.5 weight percent most preferred.

The tin content of the lead-tin alloy is of particular importance in the practice of the invention. Maximum benefits are obtained in the tin composition range from 0.1 weight percent tin to 1.5 weight percent. Below 0.1 weight percent tin reliability and lifetime of post seals might not be at a maximum but some benefits are apparent down to about 0.02 weight percent tin. For some applications, limited benefits are often sufficient since other failure mechanisms limit the lifetime of the battery. For example, frequently used lead-acid batteries, such as automobile batteries, often have limited lifetimes and even modest increases in the lifetimes of the positive post seals guarantee high reliability throughout the lifetimes of the lead-acid battery. Tin contents greater than 1.5 weight percent continue to yield highly reliable post seals. However, there is considerable danger of phase separation at room temperatures at these high tin contents which might be detrimental to battery performance. Also, there are no added benefits to tin contents greater than 1.5 weight percent.

Preferred is a range from 0.2 to 1.2 or even from 0.6 to 0.9 weight percent with 0.75 weight percent most preferred.

Beneficial results are obtained in a variety of adhesives used in the post seal and a variety of designs used in the post seal. An extremely useful adhesive material is epoxy resin. Many of these epoxy resins are described in standard references such as *Epoxy Resins-Chemistry and Technology* by C. A. May and Y. Tanaka, Marcel Dekker, Inc., New York 1973. Typical epoxy resins are condensation products of phenols (e.g., bisphenol A) and epichlorohydrin with the degree of polymerization small (usually 5 to 12 repeating units). The epoxy resin is usually cured with a trifunctional amine or polybasic acid anhydride. A particularly useful epoxy resin system is the diglycidyl ether of bisphenol A and a curing agent containing poly(oxypropylene-triamine). A typical composition (within±10 percent) is 100 parts by weight epoxy resin and 35 parts by weight curing agent.

The invention is useful for a variety of lead-acid battery designs including rectangular batteries with vertical plates (the usual conventional design) and right cylindrical cells with horizontal plates. The invention will be described in terms of the right cylinder battery because its longer expected lifetime makes application to this type of battery potentially more significant.

FIG. 1 shows a typical right cylindrical battery in a front perspective view largely cut away to show details of the grids and the stacking arrangement. The battery receptacle, 10, is of a standard material (polyvinylchloride) but is cylindrically shaped to accommodate the stack of circularly shaped grids. The cover, 11, of the receptacle is shown partly cut away and is provided with 4 openings. The flange, 12, defines an opening for the negative post, 13, and the flange, 14, surrounds the opening for the positive post. The flanges, 12 and 14, include depending portions which protrude below the cover, 11, and form a seat for the posts. The secondary seals are flexible tubes, 19 and 20, made of acid-resistant material. The primary seals are described in more detail below.

Another opening in the cover assembly is surrounded by a vertical cylindrical flange, 21, which accommodates a filling funnel, 22. The filling funnel, 22, is used to introduce electrolyte or water into the battery container. A vent with skirted plug, 23, is also shown on the battery cover. The funnel is generally rigid and may be constructed of microporous polyethylene, polypropylene, Teflon, ceramic, stoneware or similar acid-resistant material or combination of these materials.

The grid assembly, 30, is composed of positive and negative grids stacked alternately in a vertical interleaving arrangement. The base plate, 31, supports the stack and is shaped to slope upward toward the cell center. This sloping characteristic is common to all of the stacked grids as shown in FIG. 1.

Figure 2:
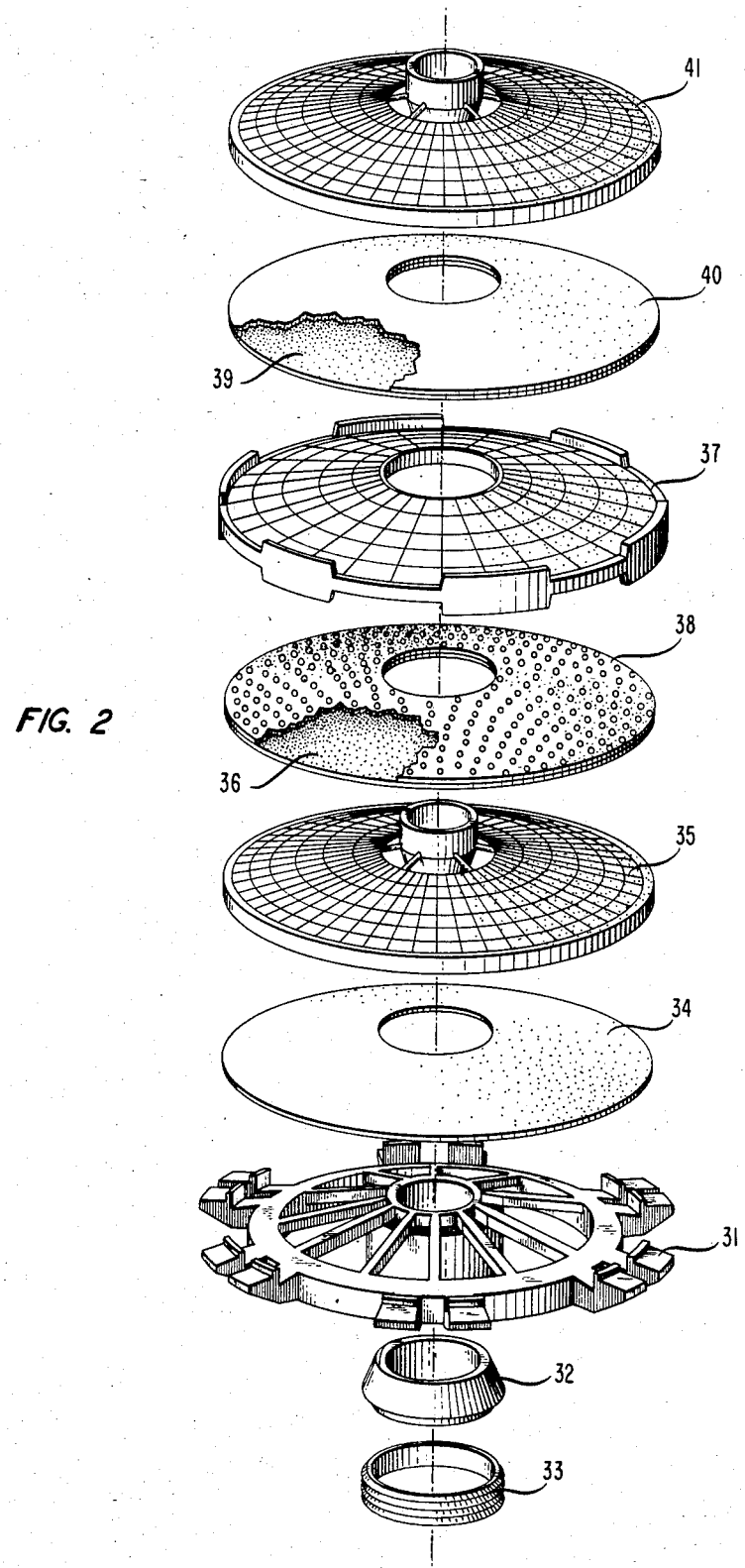
FIG. 2 shows some of the components of the battery shown in FIG. 1 on an expanded scale.

The grid arrangement is shown more clearly in FIG. 2. The base plate, 31, is shown together with a lead plug, 32, and nut, 33, for attachment to the negative post. Above the base plate is the separator, 34, the negative plate, 35, and glass mat, 36. Adjacent to and below the positive plate, 37, is a separator, 38, and adjacent to and above the positive plate, 37, is a separator, 39. Above this separator is a glass mat, 40, and then the structure is repeated again beginning with a negative plate, 41.

Figure 3:
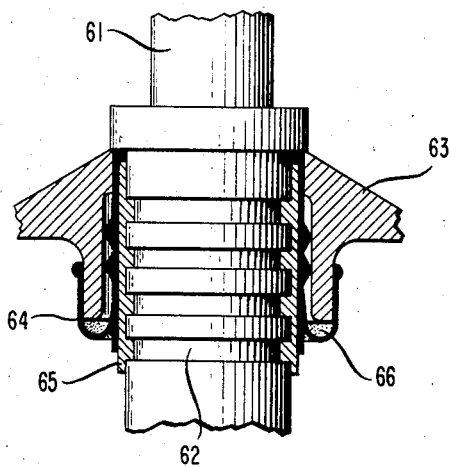
FIG. 3 shows a particular post seal design useful for lead-acid batteries including the one shown in FIG. 1.

FIG. 3 shows the positive post seal in somewhat more detail. Shown are the inner positive post, 61, with its ribbed or grooved outer structure, 62. Often the inner positive post, 61, is made of an anitmony alloyed lead (typically 3-8 weight percent) to increase rigidity and inside this inner post a metallic post made of highly electrically conducting material such as copper. The invention for the most part is concerned with the outer portion or surface portion, 62, of the positive post. Also shown in the battery jar cover, 63, and flexible rubber sleeve, 64. This sleeve is usually made of butyl rubber. The ribbed or grooved structure, 62, of the positive post, 61, is to facilitate sealing the rubber sleeve, 64, to the positive post, 61. An adhesive, 65, is used to make this seal between rubber sleeve, 64, and positive post, 62. A variety of adhesives may be used for this seal. An epoxy adhesive is preferred for a variety of reasons discussed elsewhere in this application. The ribbed or grooved structure of the positive post mechanically locks in the epoxy adhesive, 65, and maximizes the path length of the seal between epoxy adhesive, 65, and positive post, 61. The other end of the rubber sleeve is attached to the battery jar cover, 63, by means of a butyl adhesive, 66. The positive post, 61, is made of lead-tin alloy in accordance with the invention. The negative post assembly usually has the same design and sometimes the negative post is made with a lead-tin alloy like the positive post for convenience.

The major advantage to the use of lead-tin alloy in the positive post is the retardation in the formation of blisters under conditions of the lead-acid battery. Tests were carried out under various conditions to show the improved performance of tin-lead alloy in the adherence of the epoxy adhesive to the positive post. The data are summarized in FIGS. 4, 5 and 6.

The tests were carried out on an epoxy to lead alloy seal using a particular epoxy system described below and various tin contents for the lead alloy. Pure lead was also included in the tests. The tests were carried out in sulfuric acid with concentration approximately the same as that found in the electrolyte of lead-acid battery (30 weight percent). A voltage was applied to the positive post structure to approximately duplicate the conditions found in lead-acid batteries. This voltage was measured against a standard $Hg/Hg_2SO_4$ cell usually used in lead-acid battery work. In typical lead-acid batteries, the positive post voltage in terms of this standard cell is approximately 1.090. Somewhat higher potentials were used in these tests to accelerate blistering. Tests were carried out at three temperatures; namely, 27 degrees C. (approximating normal room temperature use), 43 degrees C., and 49 degrees C. It is believed that at a potential of 1.3 V and a temperature of 49 degrees C. that battery aging is accelerated by a factor of approximately 100.

The degree of blistering was measured by direct observation. The areas set forth in FIGS. 4, 5 and 6 which is taken to be proportioned to the amount of corrosion involved were measured by ascertaining the height and diameter of corrosion blisters and calculating the area assuming a hemispherical shape.

Figure 4:
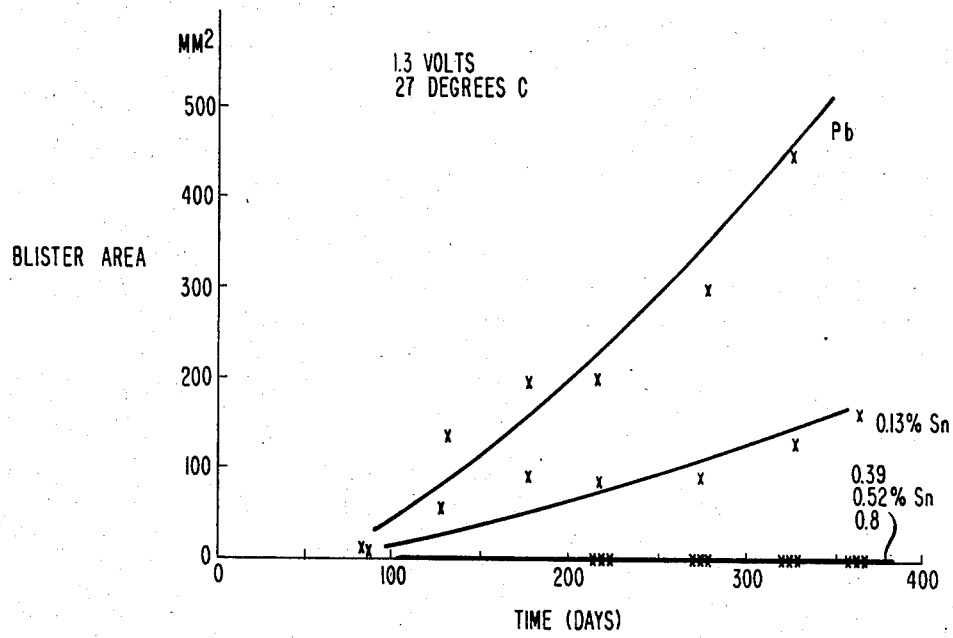
FIG. 4 shows data in the form of a graph on the extent of blister corrosion in a post seal as a function of time for pure lead and various lead-tin alloys at 27 degrees C.
Figure 5:
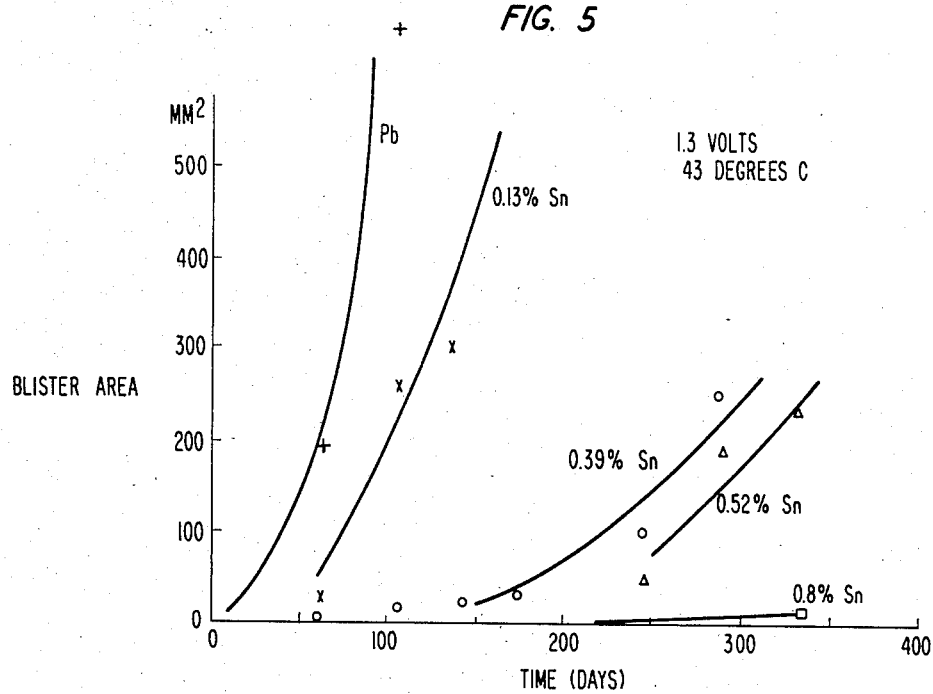
FIG. 5 shows the same plot of data as in FIG. 3 at 43 degrees C.
Figure 6:
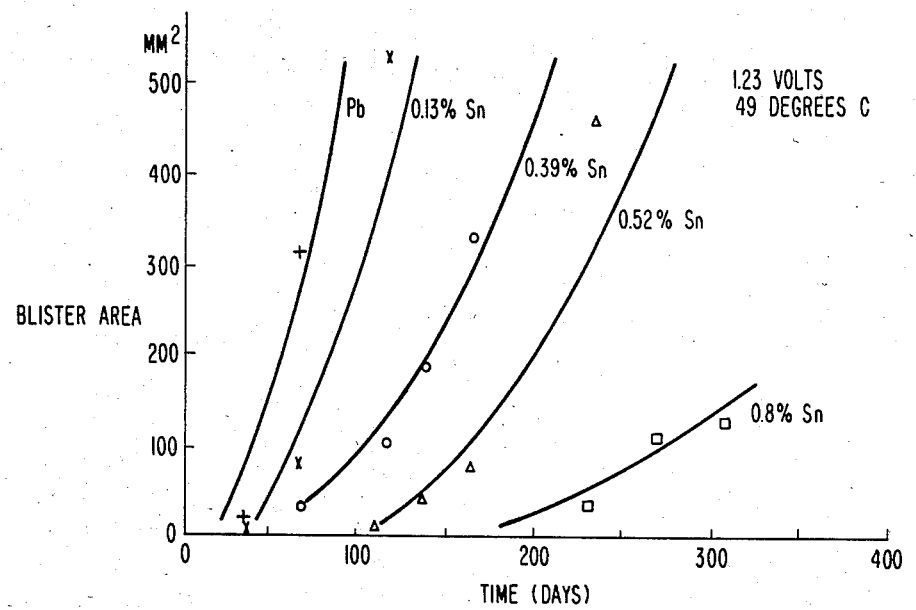
FIG. 6 shows the same plot of data as FIG. 3 taken at 49 degrees C.

As can be seen from FIGS. 4, 5 and 6, the presence of tin in the positive post material drastically reduces blisters occurring in lead-acid batteries. At room temperature, this reduction in blistering is such that above a tin content of 0.39 weight percent, it is essentially unmeasurable after a year. At higher temperatures shown in FIGS. 5 and 6, the amount of blistering is measurable but drastically reduced by the presence of tin in the positive post material. At a tin content of approximately 0.8 weight percent and assuming the acceleration factor set forth above, blistering should be nonexistent in these epoxy seals throughout the lifetime of the battery.

These tests show that even the use of relatively small amounts of tin in the positive post, the seal between positive post and rubber sleeve can be made essentially free of blistering throughout the lifetime of the battery and that the presence of modest amounts of tin can drastically reduce unwanted corrosion on the positive structure of lead-acid batteries.

What is claimed is:

1. A lead-acid battery comprising in combination
   a. a battery receptacle containing positive electrode, negative electrode and electrolyte;
   b. a cover for said receptacle in which there is at least one opening in said cover;
   c. a positive electrode post mounted within said receptacle and extending through said opening; and
   d. sealing means comprising epoxy seal for preventing leakage of electrolyte between said positive electrode post and said cover characterized in that the surface of the positive post to which the epoxy seal is made consists of lead-tin binary alloy, said alloy consisting of from 0.1 to 1.5 weight percent tin remainder lead.

2. The lead-acid battery of claim 1 in which the tin content of the tin-lead alloy is from 0.2 to 1.2 weight percent.

3. The lead-acid battery of claim 1 in which the epoxy seal comprises epoxy resin comprising diglycidyl ether of bisphenol A and curing agent comprising trifunctional amine or polybasic acid anhydride.

4. The lead-acid battery of claim 3 in which the curing agent comprises poly(oxypropylene-triamine).

5. The lead-acid battery of claim 1 in which the outer portion of the positive electrode post has a ribbed structure and the seal is made by sealing with epoxy adhesive a flexible rubber sleeve to the surface of the positive electrode structure.

6. The lead-acid battery of claim 1 in which the electrodes are placed horizontal and the battery jar is in the form of a right cylinder.

* * * * *